United States Patent [19]
Thomson

[11] Patent Number: 5,636,263
[45] Date of Patent: Jun. 3, 1997

[54] DISPATCHER-ACTIVATED RESPONSE IDENTIFICATION LIGHT (DARIL) AND METHOD FOR USE THEREOF

[76] Inventor: James D. Thomson, 206 Howard St., Bellevue, Ohio 44811

[21] Appl. No.: 534,341

[22] Filed: Sep. 27, 1995

Related U.S. Application Data

[63] Continuation of Ser. No. 215,309, Mar. 21, 1994, abandoned.

[51] Int. Cl.$^6$ .................................................. H04M 11/00
[52] U.S. Cl. ............................................ 379/45; 379/102
[58] Field of Search .................................. 379/45, 38, 39, 379/40, 41, 42, 43, 44, 50, 51, 102, 104, 105

[56] References Cited

U.S. PATENT DOCUMENTS

| | | | |
|---|---|---|---|
| 4,760,593 | 7/1988 | Shapiro et al. | 379/38 |
| 4,931,780 | 6/1990 | Lamont et al. | 379/45 |
| 4,935,951 | 6/1990 | Robinson et al. | 379/45 |
| 5,119,412 | 6/1992 | Attallah | 379/102 |
| 5,210,784 | 5/1993 | Wang et al. | 379/38 |

*Primary Examiner*—Stella Woo
*Attorney, Agent, or Firm*—Donald A. Bergquist; Howard M. Cohen

[57] ABSTRACT

Apparatus is disclosed that will temporarily identify a building, house, or other structure to which emergency personnel have been dispatched. The apparatus, which is activated remotely by an emergency service dispatcher, includes, in one embodiment, a high-intensity stroboscopic light emitting diode (LED) placed in a location that is visible from the exterior of the structure, especially from the street. The circuit that activates and deactivates the LED is triggered by the dispatcher, who causes a specific tone to be transmitted over the telephone line after an individual in the structure telephones the emergency dispatcher. This new apparatus allows the practice of a new method for assuring that dispatched emergency personnel quickly and easily find the emergency site when they arrive at the general locale of the emergency. The method involves the activating of the dispatcher-activated response identification light (as the apparatus is called) by the dispatcher over the telephone line used by the person who telephones for emergency help.

7 Claims, 4 Drawing Sheets

DISPATCHER-ACTIVATED RESPONSE IDENTIFICATION LIGHT (DARIL) AND METHOD FOR USE THEREOF

This application is a continuation of application Ser. No. 08/215,309, filed Mar. 21, 1994, now abandoned.

INTRODUCTION

This invention relates to apparatus to temporarily identify a building, house, or other structure to which emergency personnel have been dispatched. More specifically, the apparatus includes a stroboscopic light emitting diode (LED) that is activated remotely by an emergency service operator who is often referred to as a "9-1-1" operator or dispatcher.

The LED may be an attachment on the exterior of the structure (as beneath the doorbell, address, or elsewhere) or as an attachment apart from the structure, as on a pole on the yard, etc.

The circuit that activates and deactivates the LED is activated by the dispatcher, who causes a tone, a dual tone, or a sequence of tones to be transmitted from a remote location after an individual in the structure calls the emergency dispatcher, either by calling "9-1-1" or another telephone number for emergency services.

This new apparatus allows the practice of a new method for assuring that dispatched emergency personnel quickly and easily find the emergency site when they arrive at the general locale of the emergency. The method involves the activating of the DARIL by the dispatcher over the telephone line used by the person who telephones for emergency help.

1. Background

Emergency workers often complain that they cannot quickly identify the location of an emergency to which they have been dispatched. Although many communities have installed what is called "enhanced 9-1-1" service, in which the address of the emergency caller's location is presented on a display unit at the dispatcher's console, this enhanced 9-1-1 service is not universally available, nor does it completely solve the problems faced by the dispatched emergency personnel who must find the specific location, which may be difficult even when address information is immediately available.

2. Prior Art

The difficulties addressed by this invention have been recognized by previous inventors who have offered their solutions in patents. It is already known to combine a basic house address display device with an emergency flashing light. For example, U.S. Pat. No. 4,611,265 issued to Davis in 1986, discloses an address display system in which the house numerals are disposed on a translucent wall illuminated by a conventional internal bulb. A flashing emergency light is also disposed within the housing. The emergency light may be actuated by the occupant from a remote switch within the residence to warn passers-by of the need for assistance. U.S. Pat. No. 4,587,753, issued in 1986 to Harper, provides an indicia display system that flashes a red light to warn of an emergency within the house.

U.S. Pat. No. 4,993,058, PHONE ACTIVATED EMERGENCY SIGNALING SYSTEM, issued in 1991 to McMinn, teaches an alarm signaling system responsive to outgoing calls to a predetermined number sequence (e.g., "9-1-1") made on a telephone line whereby, once triggered, the alarm system remains activated whether or not the telephone is placed in an on-hook condition and until a reset number sequence is dialed. The alarm system remains activated while additional calls are placed on the same telephone and until a reset number sequence is dialed. A test number sequence may be dialed to set the system in the alarm state without placing an emergency call and until a reset number sequence is dialed.

It will be seen below that the present invention is in contrast with that of other inventions, and particularly that of McMinn in that the system of the present invention is capable of being placed in the alarm state only by the "9-1-1" dispatcher or another person having a suitable tone generator. The dispatcher would activate the DARIL only when an emergency team is dispatched, thereby eliminating the all too common problem of misuse. In addition, suppliers of other emergency systems that dispatch emergency teams and who are accessed by calls to a telephone number other than "9-1-1" can be allowed the capability of activating the DARIL herein described.

Misuse of any of the aforementioned alarm systems may result from subscribers who activate the alarm system to aid a delivery person find the proper house to which to make a delivery, and by "9-1-1" calls for non-emergency situations.

Any desirable system should not permit activation of an emergency signal by inadvertent or non-essential calls to emergency dispatchers, nor should the caller have the ability to automatically activate the system.

Using the McMinn system, when multiple calls (from callers at various locations) are made to "9-1-1" to report an emergency condition, each caller's emergency locator system is activated (at least momentarily), creating the potential for the responding emergency team to become confused as to the exact location of the emergency.

The present invention may be powered totally by a voltage that is present in the telephone line. Internal rechargeable batteries are present in the preferred embodiment, those batteries receive their charge from the telephone line. In many emergencies, the telephone lines are totally functional at a time when electric power service has been interrupted. Indeed, the electric power system in a structure may often be the cause of the emergency. At such a time, the telephone system is often more reliable than is the electric power grid, so an emergency signaling system powered by the telephone system is seen as more reliable than one powered by the electric power grid.

In contrast to prior art systems, particularly that of McMinn, using the system of the present invention, an emergency personnel dispatcher could activate the emergency signal at his/her discretion and would elect to activate such signal at only one location identified as the exact location of the emergency.

Additionally, it is seen that the McMinn system is housed within the structure. In fire emergencies, the interior of the structure may become engulfed in flames and intense heat, thereby destroying any electronic equipment within the structure. In contrast to McMinn, the electronic circuitry of the present invention is preferably housed on the service entry board of the structure, which is often located outside the structure, a location less likely to be quickly affected by excessive heat from a structure fire.

For these reasons and for other reasons, it is desirable to provide an emergency signal that is powered by the telephone lines and that is activated only by a "9-1-1" dispatcher (or other emergency personnel who may be called on the telephone) who causes to be generated a tone signal (or multiple tones in sequence or in combination) that is sent over the telephone line and activates the emergency light signal. It is intended that said dispatcher or other emergency personnel would activate the emergency light signal only upon the dispatching of personnel to attend to the emergency condition that exists or is reported to exist by the caller.

SUMMARY OF THE INVENTION

The present invention comprises a telephone-line operated emergency indicator device including a signal lamp that is remotely activated over the telephone line by a person who dispatches emergency response personnel who then must locate the structure from which an emergency call has been placed.

In a preferred embodiment, the apparatus includes a stroboscopic light emitting diode (LED) that is powered by a rechargeable battery that is kept charged by a voltage from the telephone line and is activated remotely by an emergency service operator who is often referred to as a "9-1-1" operator or dispatcher. The LED may alternatively be replaced by a gas discharge lamp, although an additional power source (including, but not limited to, standard household electrical current) may then be desirable. In this disclosure, when we use the term "LED", the reader should understand that a lamp, and especially a gas discharge lamp, may be used instead (given an adequate power supply), unless specifically noted otherwise.

The LED may be made an attachment to the exterior of the structure it is installed to identify, as on a lighting fixture, a doorbell mount, or the like, or as an attachment to apparatus apart from (but not overly far from) the structure, as on a roadside mailbox, pole light, or the like. It may also be provided as a part of a stand-alone device to be stuck into the ground, much as one installs lighting along a path or a driveway.

The circuit that energizes and discharges the LED is activated by the dispatcher, who causes a tone, a dual tone, or a sequence of tones to be transmitted from a remote location after an individual at the site of the emergency telephones the emergency dispatcher, by calling either "9-1-1" or another telephone number.

The electronic circuit that operates the signal LED comprises a decoder that senses and decodes a tone, a dual tone, or a sequence of tones imposed on the telephone line by tone-generating apparatus activated by the "9-1-1" dispatcher. When the appropriate tone, dual tone, or sequence of tones is decoded, it causes the circuit to apply a voltage that activates the signal LED, thereby to produce a highly noticeable visual signal identifying the location to which emergency response personnel have been dispatched.

One should note that this invention does not require that the caller have a touch-tone telephone. Its use is not limited to touch-tone phones and touch-tone systems. It can be used by owners of rotary telephone equipment and on rotary switching telephone systems. It requires only that a tone be made present on the telephone line, without limitation on how that tone is generated.

The electronic circuit of the best mode uses a standard dual tone decoding scheme found in touch tone dialing, though it should be tuned to detect tones different from that which can normally be generated by the standard touch tone telephone. Such a special tone may be generated by a special terminal for use by "9-1-1" dispatchers or by others who dispatch emergency assistance. It is also within the scope of this disclosure that the special tone can be generated by a hand-held tone generator intended to be carried by emergency personnel only, to be used primarily to de-activate the DARIL device after the emergency personnel arrive at the site of the emergency.

BRIEF DESCRIPTION OF THE DRAWINGS

The description of this invention will be made more clear by reference to the following drawings, wherein in each of the several drawings, the same reference number is used to indicate the same element of the invention.

DETAILED DESCRIPTION OF THE INVENTION

Figure 1:
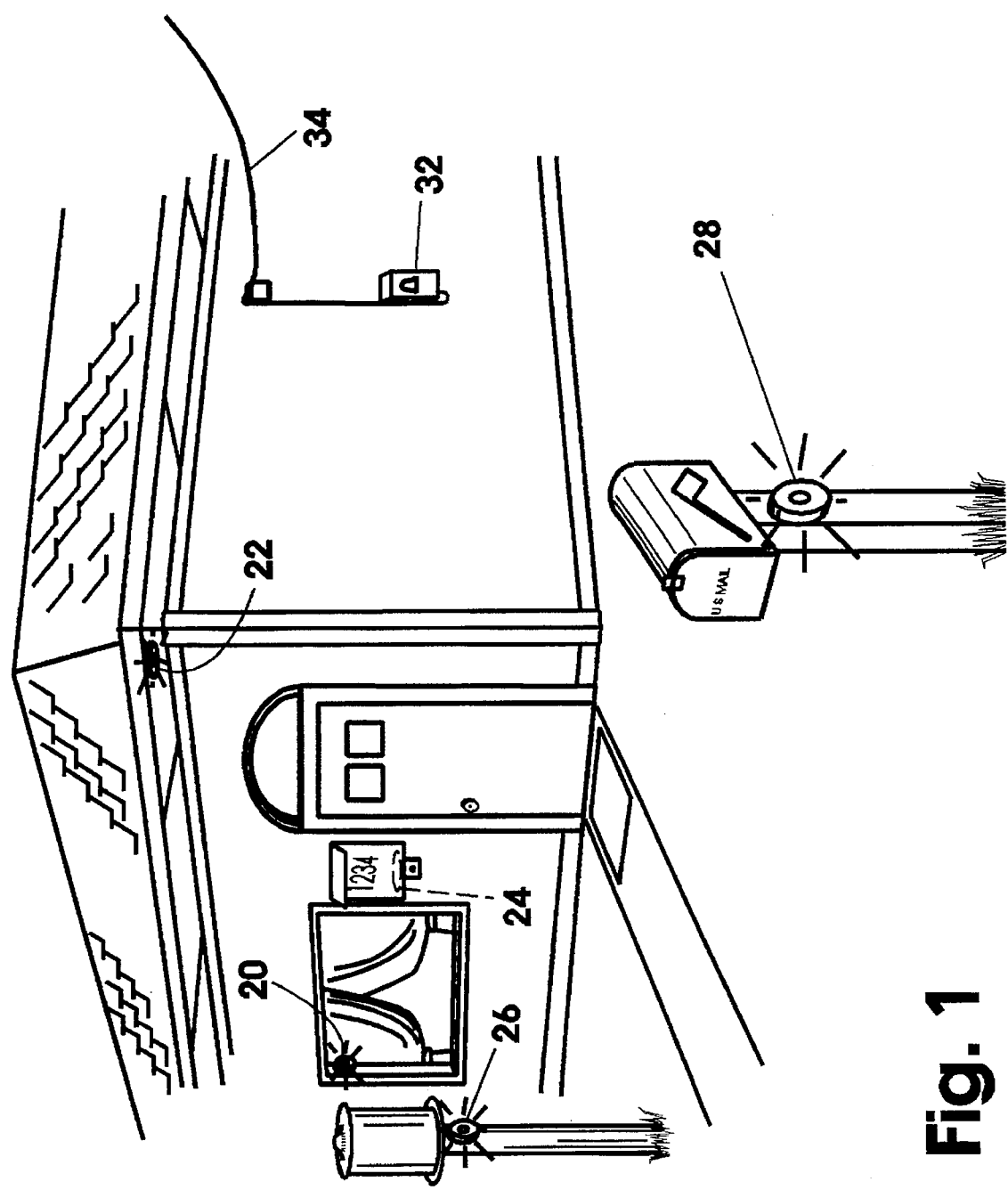
FIG. 1 illustrates a portion of a structure showing various locations where the signal flasher of this invention might be located.

Considering first FIG. 1, it is shown that locator signal flashers (i.e., the LED) may be located in one or more places visible from outside a structure and preferably visible from a street or road nearest to where the structure is located. Illustrative non-limiting examples are shown at the following locations: mounted inside a window, as at 20; under the eaves, as at 22; in a lighted address display unit or doorbell site, as at 24; in an exterior light on or around the structure, as at 26; and on the mailbox or post supporting the mailbox, as at 28. It is clear that such signal flashers can be placed at various or multiple locations, usually, but not limited to, outside a structure. Previous inventors have been ingenious in locating appropriate places to locate such signal flashers.

Throughout this disclosure, where the word structure is used, it should be interpreted as a single- or multiple-unit dwelling, including a single-family home, a multiple-family home, a single apartment or apartment building, or a business location, including an individual office or office suite, an office building, a retail establishment, a factory, a warehouse, or even a single, free-standing telephone booth, any of which has an installed telephone. In short, a structure, as used herein, is anything that comprises a telephone connected to a fixed location.

FIG. 1 also illustrates the telephone service entrance box 32 with the service line from the telephone company 34, through which the system of this invention draws its power and receives its activating signal, as well as through which service line is carried the variable voltage representing telephone conversations and the ringer signal.

Each telephone circuit in the incoming line comprises a cable pair, referred to in the trade as the "tip" and the "ring." The telephone company imposes on this cable pair a constant dc (direct current) voltage, usually 48 volts, with the ring being at ground potential and the tip being at +48 V. When a call is received, then upon this dc voltage is imposed a 90-volt ac (alternating current) ringer signal that causes the ringer in the telephone set to "ring." The ac ringer signal is stopped when the telephone is answered. The telephone conversation and any other sound to be transmitted appears on this circuit as a modulated signal of widely varying frequency imposed upon the dc voltage present in the circuit. It is to be noted that for standard telephones, no electrical energy not provided over the cable pair is needed for any function of the telephone.

In structures where special equipment is provided, either by the consumer or by the telephone company, that equipment may require power from electric service lines. The telephone company's portion of the basic system, however, is powered by the telephone company over the cable pair for each circuit. It is seen that the power required for the functions of telephone service to a structure or office is independent of other power sources.

In many emergencies, the electric service to the structure may be interrupted while the telephone service remains uninterrupted, Thus, an emergency signaling system that relies totally upon power received through the telephone cable pair may be considered extremely reliable. Although the use of the telephone cable pair as the total source of power is included in the best mode of practicing this invention, the use of standard household electric service is not totally without merit and should be considered a viable option in the practice of this invention.

Although an electrochemical cell or battery may be considered as a reliable power source for electronic safety equipment, it is sadly evidenced by investigations of household fires that individuals are generally lax in replacing batteries in safety equipment. Many homes with smoke detector alarms have non-working batteries in them. Only rechargeable batteries that are automatically kept at maximum charge should be considered for advanced electronic safety equipment. Rechargeable batteries kept fully charged by power delivered over the telephone cable pair should be the most reliable source of power for the present invention, so that option is here presented.

In the best mode, therefore, the circuitry and the control for the present invention is to be placed near or within the telephone service entry box from which it is to be powered by the telephone company's incoming cable pair. The incoming cable pair usually has lightning arresters and overload protection associated therewith. It is assumed that the apparatus of the present invention would connect to the protected side of such protective equipment, but this assumption should not be considered a limitation on the present invention.

As an alternative, the apparatus of the present invention could also be provided as a portable or semi-portable unit installed indoors on a telephone line by means of a standard telephone jack plugged into a standard telephone receptacle. This does not preclude its use in any hard-wired telephone system where modular jacks and receptacles are not used and where the wires must be manually attached to terminals in a telephone junction box. Such a portable unit must include a signal light that can be placed in or near a window to provide visibility from the outside, preferably from the street.

Figure 2:
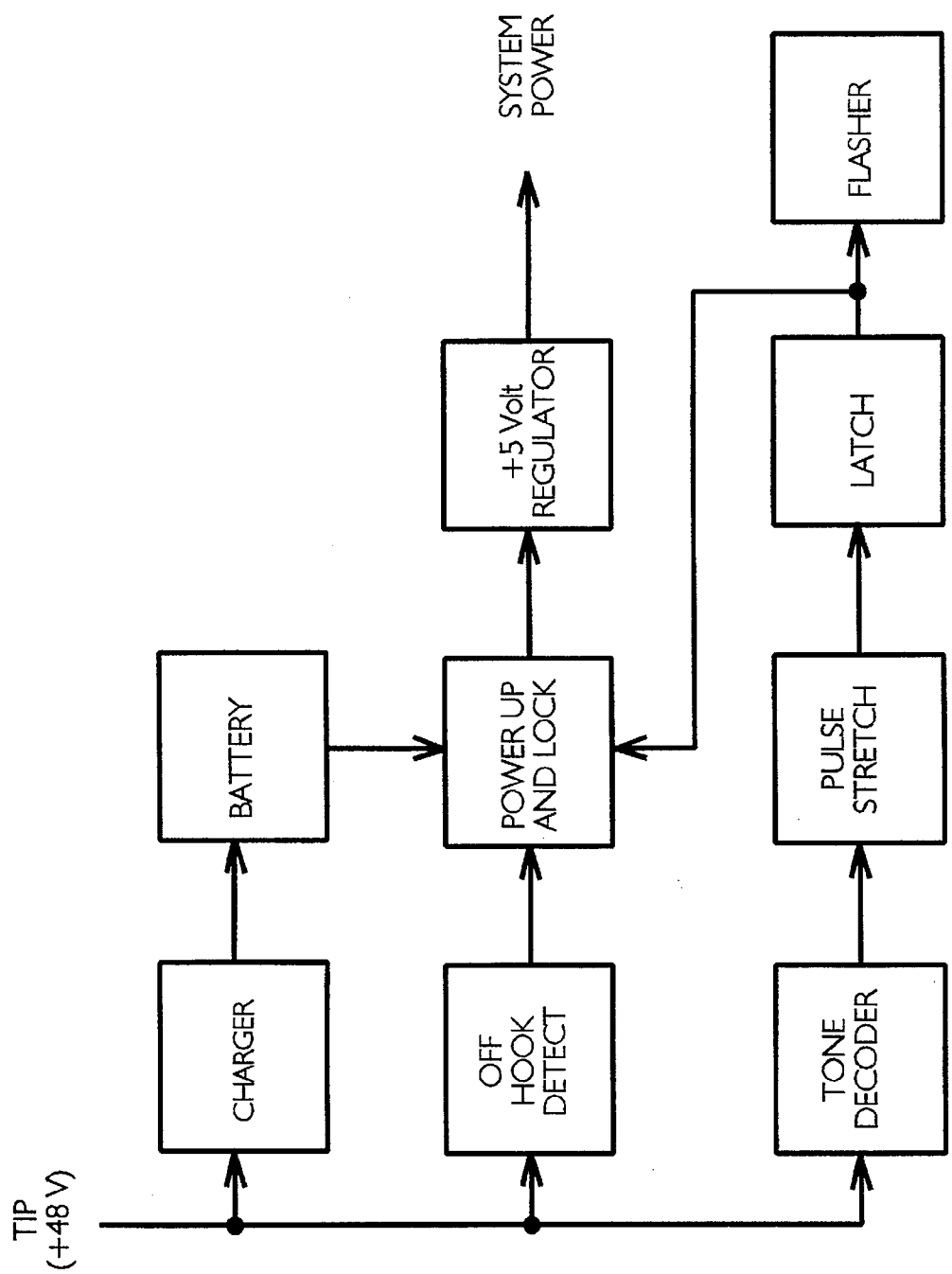
FIG. 2 is a block diagram showing the elements of a preferred embodiment of the apparatus of this invention.

FIG. 2 presents a block diagram of apparatus that would meet the needs of this invention. The figure includes connection to the TIP terminal of a telephone cable pair, from which the apparatus of this invention receives its power. Each block in the diagram has a connection (not shown) to the RING, or ground terminal of the telephone cable pair.

The CHARGER reduces the voltage supplied at the TIP and provides a suitable voltage to the rechargeable BATTERY, which is kept fully charged by this voltage. In the best mode, the CHARGER operates only while the telephone is in the on-hook condition (i.e., the telephone is not in use). This control is effected by the workings of the OFF HOOK DETECT and the POWER UP AND LOCK.

When the telephone is off the hook (i.e., in use) then the BATTERY is no longer connected to the CHARGER, and the battery is instead connected to the +5 VOLT REGULATOR that delivers SYSTEM POWER to the four remaining elements shown in the figure, the TONE DECODER, the PULSE STRETCH, the LATCH, and the FLASHER.

The TONE DECODER senses the presence on the telephone circuit of the tone or tones to which it is tuned and, upon sensing the appropriate tone, passes a signal to the PULSE STRETCH. The PULSE STRETCH then passes a signal to the LATCH, which connects the flasher to the SYSTEM POWER to enable it to begin flashing. The purpose of the PULSE STRETCH is to prevent the LATCH from being exposed to more than one signal in rapid sequence from the TONE DECODER. The PULSE STRETCH is also called a "debouncing circuit". Together, the PULSE STRETCH and the LATCH may be considered a "latch means". The LATCH also engages the locking portion of the POWER UP AND LOCK, thereby keeping the BATTERY connected to the +5 VOLT REGULATOR to maintain SYSTEM POWER and the signal FLASHER operating, even if the OFF HOOK DETECT senses that the phone has been hung-up or disconnected. The signal FLASHER may be considered a secondary circuit, since it is substantially a separate circuit that operates under the control of the output of the other elements. More than one such secondary circuits may be present to provide more than one FLASHER, at different locations about the structure, all controlled by the output of one set of the other elements.

Figure 3:
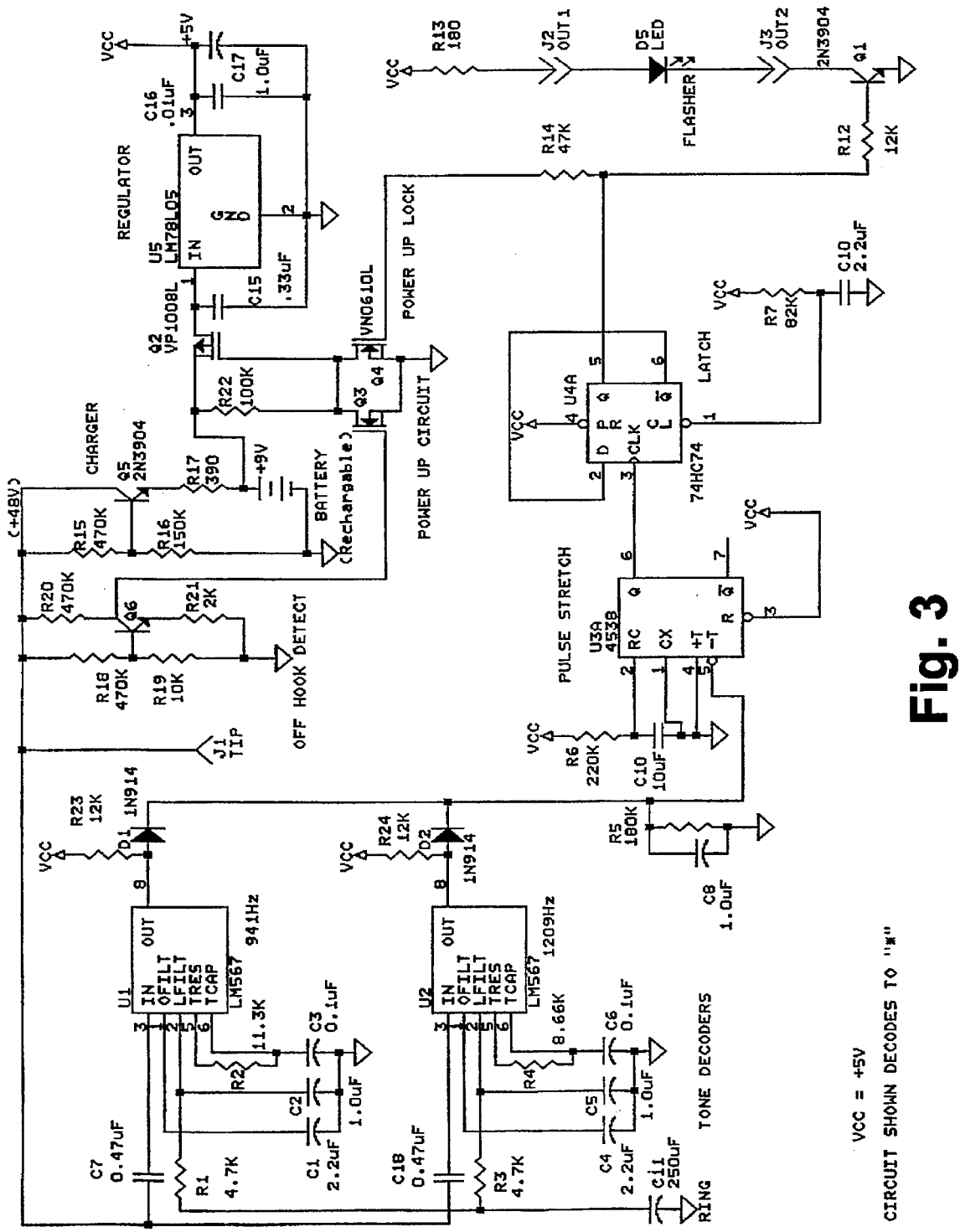
FIG. 3 is a schematic diagram of an electronic circuit capable of service in this invention.

A specific circuit that has been tested and works adequately to meet the needs of this invention is illustrated in standard electronic schematic form in FIG. 3. It will be seen that each of the blocks illustrated in FIG. 2 is expanded upon in FIG. 3. The REGULATOR, shown in FIG. 3 delivers at the terminal labeled "VCC", the +5 volt SYSTEM POWER that feeds the various other terminals labeled "VCC" on the TONE DECODER, the PULSE STRETCH, the LATCH, and the FLASHER.

The FLASHER selected for the working model that has been constructed is a high-intensity LED with on-board circuitry that causes it to flash at a nominal rate of two cycles per second when connected to a constant dc voltage as illustrated in the circuit diagram. Other LED devices may require including a circuit element to produce a pulsed voltage to operate.

Were a manual reset button installed in the circuit shown in FIG. 3, it would be effective if placed in a location that would momentarily ground the CL contact (i.e., terminal 1) of the LATCH. A normally-open push button switch not unlike a doorbell button would suffice. This reset button would not activate the FLASHER.

Having the apparatus of this invention in operation allows the use of the apparatus in a method not previously available to the "9-1-1" emergency system or to any other telephone-based emergency system. For the first time, the activating of and emergency flasher to identify the specific site of an emergency may be activated based upon the judgement of the person who dispatches the emergency team to the site. This method will create less confusion than other telephone-based emergency locator systems that have heretofore been proposed.

Figure 4:
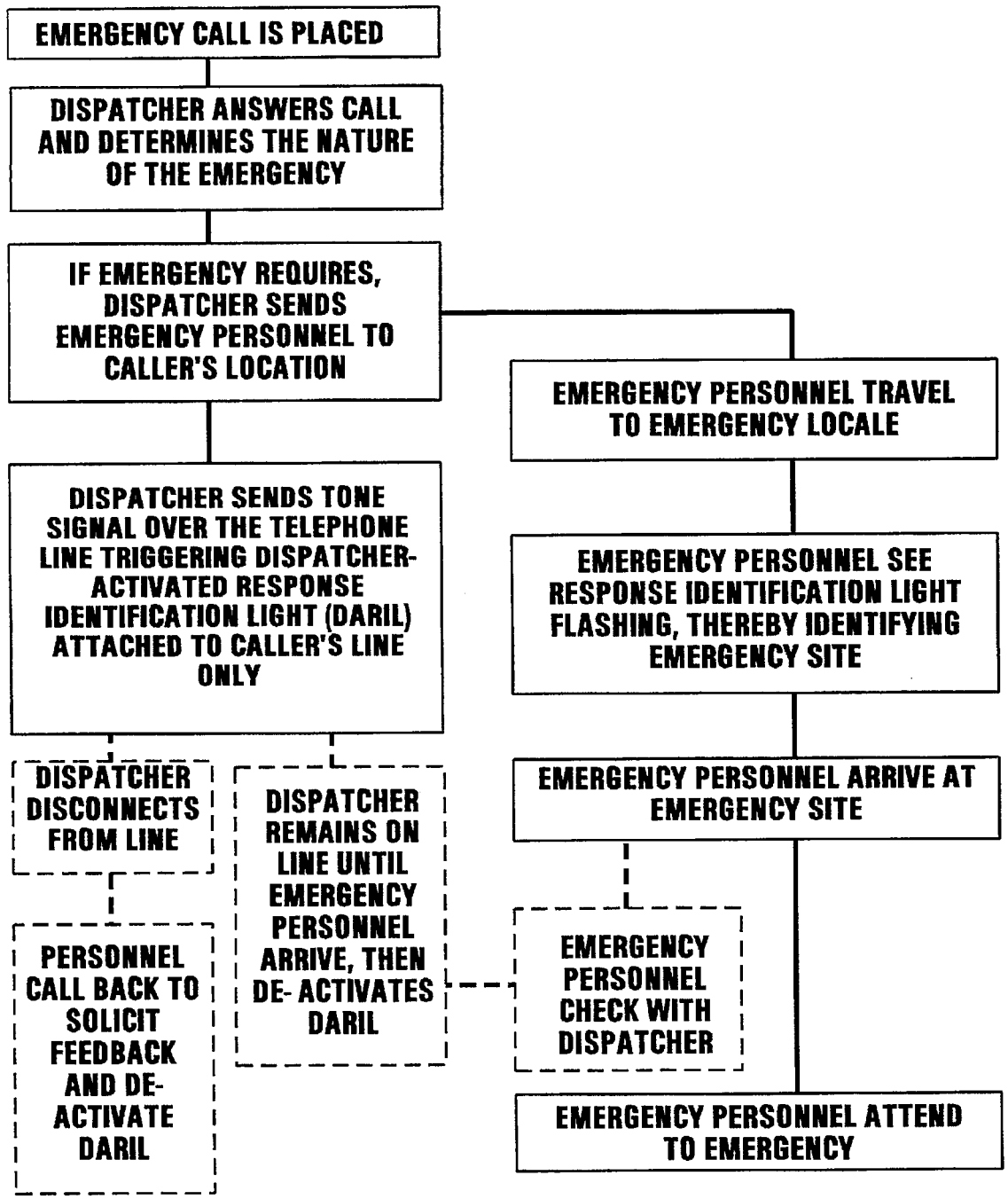
FIG. 4 is a box diagram showing the method of this invention.

Thus, the method illustrated in FIG. 4 is an integral part of this disclosure. The steps in this method are illustrated in a time sequence from the top of the figure to the bottom and are described in terms of calling a "9-1-1" emergency system. Naturally, the method would work in the same manner if a non-"9-1-1" emergency system were called, so long as the dispatcher had equipment to generate the needed triggering code or code combination.

The method is initiated by an occupant of a structure who calls to report an emergency. Dispatchers working on "9-1-1" systems are trained to evaluate emergency calls to determine the nature of the emergency so the proper emergency personnel can be dispatched. In many cases no emergency personnel are necessary, so none are dispatched.

A judgement is made by the "9-1-1" dispatcher as step two of this method. In step three, the dispatcher sends emergency personnel to the caller's address. Step four may be simultaneous with step three in that the dispatcher causes a tone or tones over the telephone line to trigger the emergency locator system that is attached to the caller's phone line. Other calls reporting the same emergency would likely be recognized by the "9-1-1" dispatcher, so additional emergency locators in the neighborhood of the original caller would not be activated. This is at the discretion of the "9-1-1" dispatcher, however, and not at the discretion of the caller.

In most cases, the "9-1-1" dispatcher stays on the line to be the contact person linking the emergency site to the sources of emergency aid. Often the dispatcher advises the caller of steps to take to ameliorate the emergency before the emergency personnel arrive. Meanwhile, the emergency personnel are travelling to the emergency locale and, seeing the emergency signal flasher, know exactly where the emergency is located. In some cases, of course, the signal flasher may be at the location not of the emergency, but of a person who knows where the emergency is.

Common practice is for the emergency personnel to advise the "9-1-1" dispatcher of their arrival by picking up the telephone and talking to the dispatcher. The dispatcher may have gained from the caller additional information that was not transmitted to the emergency response personnel by radio. The dispatcher would deactivate the DARIL by sending another tone or tones over the telephone line.

Alternatively, for cases in which telephone contact has not been maintained, the emergency personnel on the scene could deactivate the DARIL by means of a hand-held tone generator capable of putting the required tone on the telephone line, thereby resetting the DARIL locally. Such a portable tone generator gives the emergency personnel the ability to re-initiate the DARIL signal to aid back-up personnel to locate the emergency, should they be needed.

In another embodiment, a reset button may be present in the circuit to allow manual resetting of the DARIL system. No button would be provided to re-initiate the DARIL signal, however.

In yet another scenario, the reset could be accomplished remotely during a follow-up call to the emergency site by the dispatcher or by other follow-up personnel who might also collect data regarding timeliness and quality of service delivered by the emergency system.

Thus, it can be seen that this method, while including several steps already in current use, includes a new step heretofore not available—that of the dispatcher triggering an emergency locator system. This step is made possible by the apparatus of this invention.

The foregoing is considered as only illustrative of the principles of the invention. Further, since numerous modifications and changes will readily occur to those skilled in the art, it is not desired to limit the invention to he exact construction and operation shown and described. Accordingly, all suitable modifications and equivalents that may be resorted to should be considered as falling within the scope of the invention if they fall within the attached claims.

I claim:

1. An emergency condition signaling system that is responsive only to a specific tone signal transmitted from a first location through a telephone service line interconnected thereby with a telephone at a second location, said system comprising:

an electronic circuit means interconnected with said telephone service line for generating an alarm signal at said second location in response to said specific tone signal transmitted through said telephone service line, said electronic circuit means comprising;
   a decoder means interconnected with said telephone service line for outputting a fixed signal at said second location in response to said specific tone signal being transmitted through said telephone service line; and
   an electronic latch means responsive to said fixed signal for closing a secondary circuit and holding said secondary circuit closed after said fixed signal is no longer present, said secondary circuit comprising a light-emitting alarm activated when said secondary circuit is closed.

2. An emergency condition signaling system according to the teachings of claim 1 and wherein said secondary circuit receives all its power from said telephone service line.

3. An emergency condition signaling system according to the teachings of claim 1 and wherein said secondary circuit is powered by standard household electric current.

4. An emergency condition signaling system according to the teachings of claim 1 and wherein said secondary circuit is powered by an electrochemical battery source.

5. An emergency condition signaling system according to the teachings of claim 4 and wherein said battery source is a rechargeable cell.

6. An emergency condition signaling system according to the teachings of claim 5 and wherein said rechargeable cell is recharged by energy delivered over said telephone service line.

7. An emergency condition signaling system that is responsive only to a specific tone signal transmitted from a first location through a telephone service line interconnected thereby with a telephone at a second location, said system comprising:

an electronic circuit means interconnected with said telephone service line for generating a tone decoder signal at said second location in response to said specific tone signal transmitted through said telephone service line but not in response to signals generated by said telephone, said electronic circuit means comprising:
   a decoder means interconnected with said telephone service line for outputting a fixed signal at said second location in response to said specific tone signal being transmitted through said telephone service line only from said first location; and
latch means responsive to said fixed signal for closing a secondary circuit and holding said secondary circuit closed after said fixed signal is no longer present, said secondary circuit comprising a light-emitting alarm activated when said latch means is closed.

* * * * *